United States Patent
Kim et al.

(10) Patent No.: US 11,845,884 B2
(45) Date of Patent: Dec. 19, 2023

(54) ADHESIVE RESIN AND ADHESIVE COMPOSITION FOR OPTICAL MEMBER INCLUDING SAME

(71) Applicant: LG Chem, Ltd., Seoul (KR)

(72) Inventors: Yoon Jung Kim, Daejeon (KR); Min Ki Lee, Daejeon (KR); Eun Suk Kim, Daejeon (KR); Kee Young Kim, Daejeon (KR)

(73) Assignee: LG Chem, Ltd.

( * ) Notice: Subject to any disclaimer, the term of this patent is extended or adjusted under 35 U.S.C. 154(b) by 609 days.

(21) Appl. No.: 17/046,554

(22) PCT Filed: Oct. 29, 2019

(86) PCT No.: PCT/KR2019/014333
§ 371 (c)(1),
(2) Date: Oct. 9, 2020

(87) PCT Pub. No.: WO2020/116782
PCT Pub. Date: Jun. 11, 2020

(65) Prior Publication Data
US 2021/0147728 A1 May 20, 2021

(30) Foreign Application Priority Data
Dec. 7, 2018 (KR) .................. 10-2018-0156716

(51) Int. Cl.
| | |
|---|---|
| *C09J 133/10* | (2006.01) |
| *C09J 133/08* | (2006.01) |
| *C09J 11/06* | (2006.01) |
| *B32B 7/12* | (2006.01) |

(52) U.S. Cl.
CPC ............ *C09J 133/10* (2013.01); *C09J 11/06* (2013.01); *C09J 133/08* (2013.01); *B32B 7/12* (2013.01); *B32B 2457/20* (2013.01); *B32B 2457/202* (2013.01); *C09K 2323/05* (2020.08); *C09K 2323/057* (2020.08); *C09K 2323/059* (2020.08)

(58) Field of Classification Search
CPC ............ C08F 220/1804; C08F 220/20; C08F 222/16; C08F 222/102; C08F 222/1006
See application file for complete search history.

(56) References Cited

U.S. PATENT DOCUMENTS

| | | |
|---|---|---|
| 2004/0157977 A1 | 8/2004 | Kotsubo et al. |
| 2008/0302479 A1 | 12/2008 | Barker et al. |
| 2009/0067047 A1 | 3/2009 | Ueda et al. |
| 2012/0320317 A1 | 12/2012 | Yoon et al. |
| 2013/0321539 A1 | 12/2013 | Hiraoka |
| 2016/0230054 A1 | 8/2016 | Lee et al. |
| 2017/0009010 A1 | 1/2017 | Curatolo |

FOREIGN PATENT DOCUMENTS

| | | | |
|---|---|---|---|
| CN | 106661406 A | 5/2017 | |
| JP | 2003003150 A | 1/2003 | |
| JP | 2007191613 A | 8/2007 | |
| JP | 2008174612 A | 7/2008 | |
| JP | 2008310116 A | 12/2008 | |
| JP | 2013249357 A | 12/2013 | |
| JP | 2017052251 A | 3/2017 | |
| JP | 2017052252 A | 3/2017 | |
| JP | 2017111322 A | 6/2017 | |
| KR | 20080106237 A | 12/2008 | |
| KR | 20120109411 A | 10/2012 | |
| KR | 101347122 B1 | 1/2014 | |
| KR | 101494495 B1 * | 2/2015 | ............ C09J 133/04 |
| KR | 20150017446 A | 2/2015 | |
| KR | 20150045909 A | 4/2015 | |
| KR | 20150060593 A | 6/2015 | |
| KR | 20160084569 A | 7/2016 | |
| KR | 20170070753 A | 6/2017 | |
| KR | 20170077768 A | 7/2017 | |
| WO | 2017102506 A1 | 6/2017 | |

OTHER PUBLICATIONS

Extended European Search Report for EP Application No. 19893331.9 dated Sep. 14, 2021, 2 pgs.
Chinese Search Report for CN Application No. 201980025273.2 dated Aug. 4, 2021, 2 pgs.
International Search Report for Application No. PCT/KR2019/014333 dated Jan. 29, 2020, 2 pages.

* cited by examiner

*Primary Examiner* — Eli D. Strah
(74) *Attorney, Agent, or Firm* — Lerner David LLP

(57) ABSTRACT

An adhesive resin and an adhesive composition for an optical member including the same is provided. The adhesive resin includes an acrylic copolymer formed by polymerizing a monomer mixture including a monomer represented by [Formula 1], a (meth)acrylic monomer having a cross-linkable functional group, and an alkyl (meth)acrylate-based monomer.

10 Claims, No Drawings

ADHESIVE RESIN AND ADHESIVE COMPOSITION FOR OPTICAL MEMBER INCLUDING SAME

CROSS-REFERENCE TO RELATED APPLICATIONS

The present application is a national stage entry under 35 U.S.C. § 371 of International Application No. PCT/KR2019/014333 filed on Oct. 29, 2019, which claims priority to Korean Patent Application No. 10-2018-0156716, filed on Dec. 7, 2018, the disclosures of which incorporated herein in their entirety by reference.

TECHNICAL FIELD

The present invention relates to an adhesive resin and an adhesive for an optical member including the same. More specifically, the present invention relates to an adhesive resin having no significant change in properties even when exposed at a high temperature and maintaining high durability even when used for a long time and an adhesive composition for an optical member including the same.

BACKGROUND ART

In general, a liquid crystal display device (LCD) is provided with a liquid crystal cell including a liquid crystal, and a polarizing plate, and an adhesive layer is used to attach the liquid crystal cell and the polarizing plate. For an adhesive forming the adhesive layer, an acrylic resin, rubber, a urethane-based resin, a silicone-based resin, ethylene vinyl acetate (EVA) or the like is used. Among these, an adhesive based on an acrylic resin having transparency, oxidation resistance, and yellowing resistance is widely used.

Meanwhile, in recent years, display devices including a polarizing plate are used in various products such as portable products, vehicle-mounted products, outdoor meters, computers, televisions, and the like, and the application field thereof is more and more expanding. As the application field thereof is diversified, an environment in which a display device is used is getting more severe. Accordingly, the display device is required to have high durability even in an environment having high temperature, high humidity and/or extreme change in temperature or humidity. Therefore, adhesives applied to a display device are also required to maintain excellent adhesive properties even when exposed to a high temperature or high humidity environment for a long time. However, adhesives developed to date do not sufficiently meet the above requirements. Therefore, the development for an adhesive composition capable of implementing high durability in severe environments is required.

DISCLOSURE OF THE INVENTION

Technical Problem

The present invention is to solve the above problems, to provide an adhesive resin and an adhesive composition for an optical member including the same, the adhesive resin having no significant change in properties even when exposed to a high temperature and maintaining high durability even when used for a long time.

Technical Solution

According to an aspect of the present invention, there is provided an adhesive resin including an acrylic copolymer formed by polymerizing a monomer mixture including a monomer represented by [Formula 1] below, a (meth)acrylic monomer having a cross-linkable functional group, and an alkyl (meth)acrylate-based monomer.

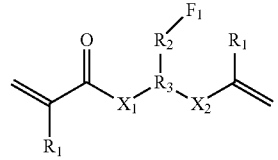

[Formula 1]

Wherein, $F_1$ is —OH, —COOH, or —SH, $X_1$ is a single bond, —O—, —NH—, an alkylene group having 1 to 10 carbon atoms, or a combination thereof, $X_2$ is a single bond, an alkylene group having 1 to 10 carbon atoms, —COO—, or a combination thereof, $R_1$ is hydrogen or an alkyl group having 1 to 4 carbon atoms, $R_2$ is a single bond or an alkylene group having 1 to 10 carbon atoms, and $R_3$ is an arene having 6 to 20 carbon atoms or an alkane having 1 to 10 carbon atoms.

According to another aspect of the present invention, there is provided an adhesive composition for an optical member including the adhesive resin according to the present invention and a multi-functional curing agent.

According to yet another aspect of the present invention, there is provided a polarizing plate and a display device including the same, the polarizing plate including an adhesive layer having a cured product of the adhesive composition for an optical member

Advantageous Effects

As in the present invention, when a copolymer is manufactured by including a monomer represented by [Formula 1] as a raw material, a copolymer having a multi-crosslinking point and a branched polymer structure is formed. As a result, the adhesive resin of the present invention has a high degree of crosslinking thereof and a lower viscosity than an adhesive resin including a linear copolymer having the same weight average molecular weight. Thus, even when exposed to a high temperature and/or high humidity environment for a long time, the adhesive resin of the present invention has no significant change in properties, thereby implementing high durability.

BEST MODE FOR CARRYING OUT THE INVENTION

Hereinafter, the present invention will be described in more detail.

In the present specification, when terms such as 'include', 'has', and 'is composed of' are used, other parts may be added unless '~only' is used. Elements of a singular form may include elements of plural forms unless the context clearly indicates otherwise.

In interpreting elements, it is to be construed as including an error range even if there is no separate explicit recitation.

In the present specification, "(meth)acrylic" is a generic term for acrylic and methacrylic. For example, the term "(meth)acrylate" includes methacrylate and acrylate, and the term "(meth)acrylic acid" includes acrylic acid and methacrylic acid.

In the present specification, the term "X to Y" indicating a range refers to "X or greater and Y or less".

In the present specification, the term "branched polymer structure" refers to a polymer structure having two or more long chains grown in different directions.

The present inventors have repeatedly conducted research to develop an adhesive composition capable of maintaining excellent durability even when exposed to high temperature and/or high humidity environments for a long time, and have found that when a specific monomer is used together when producing an acrylic copolymer, a copolymer having a multi-crosslinking point and a branched polymer structure may be formed. Then present inventors have found that the above object may be achieved when the copolymer is used, and have completed the present invention.

Hereinafter, an acrylic adhesive composition according to the present invention will be described in detail.

Adhesive Resin

An adhesive resin according to the present invention includes an acrylic copolymer formed by polymerizing a monomer mixture including a monomer represented by [Formula 1] below, a (meth)acrylic monomer having a cross-linkable functional group, and an alkyl (meth)acrylate-based monomer.

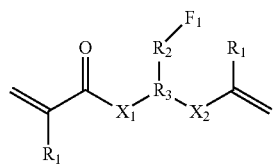

[Formula 1]

In Formula 1 above, $F_1$ is —OH, —COOH, or —SH, $X_1$ is a single bond, —O—, —NH—, an alkylene group having 1 to 10 carbon atoms, or a combination thereof, $X_2$ is a single bond, an alkylene group having 1 to 10 carbon atoms, —COO—, or a combination thereof, $R_1$ is hydrogen or an alkyl group having 1 to 4 carbon atoms, $R_2$ is a single bond or an alkylene group having 1 to 10 carbon atoms, and $R_3$ is an arene having 6 to 20 carbon atoms or an alkane having 1 to 10 carbon atoms.

The monomer represented by [Formula 1] above is a compound including a cross-linkable functional group F1 and a polymerizable double bond at both ends. When the monomer represented by [Formula 1] is used as a raw material, a cross-linkable functional group of a (meth)acrylic monomer having a cross-linkable functional group to be described later and the F1 functional group of [Formula 1] above act as a crosslinking point, so that an acrylic copolymer having a multi-crosslinking point may be produced. As a result, the degree of crosslinking of the adhesive composition is increased to implement high durability.

Specifically, the monomer represented by [Formula 1] above has two or more ethylene groups, in which radicals may be formed respectively in free radical polymerization, thereby allowing chains to grow in different directions. As a result, a branched polymer having two or more chains in different growth directions is formed. The acrylic copolymer having the branched polymer structure has lower viscosity properties than an acrylic copolymer of a linear polymer structure having the same weight average molecular weight, so that even though the solid content is increased in a coating liquid, excellent coating properties may be implemented.

Specific examples of the monomer represented by [Formula 1] above include one or more selected from the group consisting of compounds represented by Formulas 1-1 to 1-4 below, but are not limited thereto.

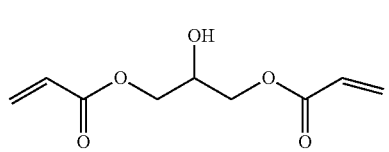

[Formula 1-1]

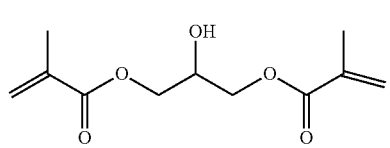

[Formula 1-2]

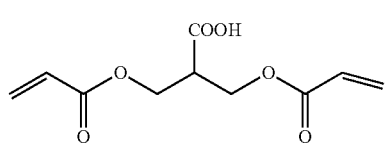

[Formula 1-3]

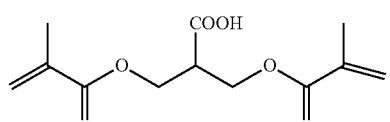

[Formula 1-4]

Meanwhile, the monomer represented by [Formula 1] above may be included in an amount of 0.01 to 1 part by weight, preferably 0.05 to 1 part by weight, more preferably 0.1 to 0.5 parts by weight based on 100 parts by weight of the monomer mixture. When the content of the monomer represented by [Formula 1] is less than 0.01 parts by weight, the effect of improving durability is insignificant. When greater than 1 part by weight, a crosslinking reaction progresses during a polymerization reaction, so that it is difficult to control the increase in molecular weight and viscosity.

Next, the (meth)acrylic monomer having a cross-linkable functional group is for improving durability, adhesion, and cohesion of an additive. Examples thereof may include a hydroxy group-containing monomer, a carboxy-containing monomer, or a nitrogen-containing monomer, but are not limited thereto. Specific examples of the hydroxy group-containing monomer may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, 2-hydroxypropylene glycol (meth)acrylate, or the like. Examples of the carboxy-containing monomers may include (meth)acrylic acid, 2-(meth)acryloyloxy acetic acid, 3-(meth)acryloyloxy propyl acid, 4-(meth)acryloyloxy butyric acid, acrylic acid dimer, itaconic acid, maleic acid, maleic anhydride, and the like. Examples of the nitrogen-containing monomer may include (meth)acrylamide, N-vinylpyrrolidone, or N-vinylcaprolactam, and the like. However, the embodiment of the present invention is not limited thereto.

The (meth)acrylic monomer including a cross-linkable functional group may be included in an amount of 0.1 to 15 parts by weight, preferably 1 to 10 parts by weight, more preferably 1 to 5 parts by weight based on 100 parts by weight of the monomer mixture. When the content of the (meth)acrylic monomer including a cross-linkable functional group satisfies the above range, more excellent adhesion and durability may be obtained.

Next, it is preferable that the alkyl (meth)acrylate-based monomer includes an alkyl group having 1-14 carbon atoms. When an alkyl group included in the alkyl (meth)acrylate-based monomer is too long, the cohesion of an adhesive is deteriorated, and it may be difficult to control the glass transition temperature (Tg) or adhesion properties. Examples of the alkyl (meth)acrylate-based monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate. In the present invention, any one thereof or a mixture of two or more thereof may be used.

The alkyl (meth)acrylate-based monomer may be included in an amount of 84 to 99.88 parts by weight, preferably 89 to 98.95 parts by weight, more preferably 94.5 to 98.9 parts by weight based on 100 parts by weight of the monomer mixture. When the content of the alkyl (meth)acrylate-based monomer satisfies the above range, excellent adhesion and durability may be obtained.

According to an embodiment, the acrylic copolymer may be formed by polymerizing a monomer mixture including 84 to 99.89 parts by weight of the alkyl (meth)acrylate-based monomer, 0.01 to 15 parts by weight of the (meth)acrylic monomer including a cross-linkable functional group, and 0.01 to 1 part by weight of the monomer represented by [Formula 1] based on 100 parts by weight of the monomer mixture.

The acrylic copolymer according to the present invention may be prepared by mixing each of the monomers described above to prepare a monomer mixture, and then polymerizing the mixture. At this time, the polymerization method is not particularly limited. Various polymerization methods known in the art, such as solution polymerization, photo polymerization, bulk polymerization, suspension polymerization, and emulsion polymerization may be used. During the polymerization, a polymerization initiator, a molecular weight control agent and the like may be additionally added. The injection time of each component is not particularly limited. That is, the components may be added all at once, or may be added at different times in installments.

In the present invention, the acrylic copolymer may be prepared by solution polymerization, in particular. It is preferable that the solution polymerization is performed by adding an initiator, a molecular weight control agent and the like at a polymerization temperature of 50° C. to 140° C. in the state in which each monomer is uniformly mixed. Examples of the initiator which can be used in the process may include conventional initiators, for example, an azo-based initiator such as azobisisobutyronitrile and azobiscyclohexane carbonitrile and the like; and/or peroxide such as benzoyl peroxide and acetyl peroxide. Any one thereof or a mixture of two or more thereof may be used, but the initiator is not limited thereto. In addition, as the molecular weight control agent, mercaptans such as t-dodecyl mercaptan and n-dodecyl mercaptan, terpenes such as dipentene and t-terpene, chloroform, halogenated hydrocarbon of carbon tetrachloride, or pentaerythritol tetrakis 3-mercapto propionate, and the like may be used. However, the molecular weight control agent is not limited thereto.

The acrylic copolymer of the present invention prepared as described above may have a weight average molecular weight of 500,000 to 1,500,000 g/mol, preferably 800,000 to 1,500,000 g/mol. When the weight average molecular weight of the acrylic copolymer is less than 500,000 g/mol, due to the insufficient cohesion of the additive caused by the deterioration in curing efficiency, re-peeling properties are deteriorated and the durability under a high temperature or a high temperature/high humidity environment is reduced. When greater than 1,500,000 g/mol, the coating properties are deteriorated due to high viscosity, so that it may be difficult to produce a uniform adhesive layer.

In addition, the acrylic copolymer of the present invention has a branched structure. The acrylic copolymer having a branched polymer structure has low viscosity properties compared with an acrylic copolymer having a linear polymer structure. Therefore, an adhesive resin including the acrylic copolymer having a branched polymer structure may implement excellent coating properties even when the solid content is high.

Adhesive Composition

Next, an adhesive composition according to the present invention will be described.

The adhesive composition according to the present invention includes the adhesive resin according to the present invention described above and a multi-functional curing agent. Since the adhesive resin has been described above, the multi-functional curing agent will be described hereinafter.

The multi-functional curing agent is for improving interfacial adhesion with an adherend, and the type thereof is not particularly limited. Various curing agents used in the art, for example, one or more selected from the group consisting of an isocyanate-based compound, an epoxy-based compound, an aziridine-based compound, and a metal chelate-based compound may be used.

As the isocyanate-based compound, any typical isocyanate-based compound known in the art may be used. For example, toluene diisocyanate, 2,4-tolyene diisocyanate, 2,6-tolyene diisocyanate, hydrogenated tolyene diisocyanate, isophorone diisocyanate, 1,3-xylene diisocyanate, 1,4-xylene diisocyanate, diphenylmethane-4,4-diisocyanate, 1,3-bisisocyanatomethyl cyclohexane, tetramethyl xylylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, tolyene diisocyanate adduct of trimethylolpropane, xylenediosocyanate adduct of trimethylolpropane, triphenylmethane triisocyanate, methylene bistriisocyanate, a polyol (trimethylol propane) thereof, or a mixture thereof, and the like may be used.

As the epoxy-based compound, for example, ethylene glycol diglycidyl ether, triglycidyl ether, trimethylolpropane triglycidyl ether, N, N, N', N'-tetraglycidylethylenediamine, glycerin diglycidyl ether, or a mixture thereof may be used.

As the aziridine-based compound, for example, N, N'-toluene-2,4-bis (1-aziridine carboxamide), N, N'-diphenylmethane-4,4'-bis (1-aziridine carboxamide), triethylene melamine, bis-isoprothaloyl-1-(2-methyl aziridine), tri-1-aziridinylphosphine oxide, or a mixture thereof may be used.

The metal chelate-based compound may be, for example, a compound in which a polyvalent metal such as aluminum, iron, zinc, tin, titanium, antimony, magnesium and/or vanadium is coordinated to acetyl acetone or ethyl acetoacetate, and the like, but is not limited thereto.

The multi-functional curing agent may be included in an amount of 0.01 to 1 part by weight, preferably 0.01 to 0.5 parts by weight based on 100 parts by weight of the adhesive resin. When the content of the multi-functional curing agent is less than 0.01 parts by weight, the effect of improving adhesion with an adherent is insignificant, and when greater than 1 part by weight, the physical properties of an adhesive may change over time.

Meanwhile, in order to control physical properties, the adhesive composition of the present invention may further include other components, such as a solvent, a silane coupling agent, a crosslinking catalyst, an adhesion imparting resin, and an additive, in addition to the components described above.

The adhesive composition of the present invention may further include a solvent for controlling viscosity. At this time, the solvent may be, for example, ethyl acetate, n-pentane, isopentane, neopentane, n-hexane, n-octane, n-heptane, methyl ethyl ketone, acetone, toluene, or a combination thereof, but is not limited thereto. The solvent may be included in an amount such that the solid content in the adhesive composition is 30 wt % or greater, preferably 30 to 60 wt %.

In addition, the adhesive composition of the present invention may further include a silane coupling agent.

The silane coupling agent improves adhesion and adhesion stability between the adhesive and a glass substrate, thereby improving heat resistance and moisture resistance. In addition, the silane coupling agent improves adhesion reliability when the adhesive is left for a long time under high temperature and/or high humidity conditions. Examples of the silane coupling agent that may be used in the present invention include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyl trimethoxysilane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetato trimethoxy silane, and any one thereof or a mixture of two or more thereof may be used. In the present invention, it is preferable to use a silane coupling agent having an acetoacetate group or a β-cyanoacetyl group, but the embodiment of the present invention is not limited thereto.

For example, the silane coupling agent may be a compound represented by Formula 2 below.

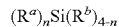

$(R^a)_n Si(R^b)_{4-n}$          [Formula 2]

In Formula 2 above, $R^a$ is a β-cyanoacetyl group, an acetoacetyl group or an acetoacetylalkyl group, $R^b$ is an alkoxy group, and n is an integer of 1 to 3. At this time, an alkyl group or an alkoxy group included in Formula 2 above may have 1 to 20, 1 to 16, 1 to 12, 1 to 8, or 1 to 4 carbon atoms, and may be linear or branched.

Specific examples of the compound represented by Formula 2 above may include acetoacetylpropyl trimethoxy silane, acetoacetylpropyl triethoxy silane, beta-cyanoacetyl trimethoxy silane, beta-cyanoacetyl triethoxy silane, and the like, but are not limited thereto.

In the composition of the present invention, the silane-based coupling agent may be included in an amount of 0.01 parts by weight to 5 parts by weight, preferably 0.01 parts by weight to 1 part by weight based on 100 parts by weight of the adhesive resin. When the content of the coupling agent is less than 0.01 parts by weight, the effect of increasing adhesion is insignificant. When greater than 5 parts by weight, durability may be deteriorated.

The adhesive composition of the present invention may further include a crosslinking catalyst. The crosslinking catalyst is for promoting curing (crosslinking) of an adhesive layer. When the crosslinking catalyst is included in the adhesive composition, there is an advantage in that it is not necessary to perform a separate aging process after a substrate surface has been subjected to coating and drying. As the crosslinking catalyst, for example, bis(tri-n-butyltin) oxide, bis(tri-n-butyltin) sulfate, di-n-butyldiphenyltin, di-n-butyltinbis(acetylacetonate), di-n-butyltinbis(2-ethylhexanoate), di-n-butyltindichloride, di-n-butyltindilaurate, di-n-butyltinoxide, dimethyldiphenyltin, dimethyltin dichloride, diphenyltin dichloride, diphenyltinoxide, hexa-n-butyltin, hexaphenyltin, tetra-n-butyltin, tetraphenyltin, tin(II) acetate, tin(II)acetylacetonate, tin chloride(II), tin iodide(II), tin(II)oxalate, and the like may be used, but the embodiment of the present invention is not limited thereto.

Meanwhile, the crosslinking catalyst may be included in an amount of 0.001 parts by weight to 0.5 parts by weight, preferably 0.001 parts by weight to 0.1 parts by weight based on 100 parts by weight of the adhesive resin. When the content of the crosslinking catalyst is less than 0.001 parts by weight, the effect of promoting curing is insignificant. When greater than 0.5 parts by weight, durability may be deteriorated.

In terms of controlling adhesion performance, the adhesive composition of the present invention may further include 1 part by weight to 100 parts by weight of an adhesion imparting resin based on 100 parts by weight of the adhesive resin. The type of the adhesion imparting resin is not particularly limited. For example, any one of or a mixture of two or more of (hydrogenated) hydrocarbon-based resin, (hydrogenated) rosin resin, (hydrogenated) rosin ester resin, (hydrogenated) terpene resin, (hydrogenated) terpene phenol resin, polymerized rosin resin, or polymerized rosin ester resin, and the like, may be used. When the content of the adhesion imparting resin is less than 1 part by weight, the effect of adding the adhesion imparting resin may be insignificant. When greater than 100 parts by weight, the effect of improving compatibility and/or cohesion may be deteriorated.

The adhesive composition of the present invention may further include one or more additives selected from the group consisting of an epoxy resin, a curing agent, an ultraviolet stabilizer, an anti-oxidation agent, a coloring agent, a reinforcing agent, a filler, an anti-foaming agent, a surfactant, and a plasticizer, to the extent that the effect of the invention is not affected.

The adhesive composition according to the present invention including the above components has low viscosity properties compared to a typical adhesive composition using an acrylic copolymer in a linear polymer structure and having the same level of weight average molecular weight. Accordingly, even when the solid content in the adhesive composition is high, excellent coating properties may be implemented. When the solid content of the adhesive composition according to the present invention is 20-30 wt %, the viscosity thereof at 23° c. is 3,000 cP or lower, preferably 1,000 cP to 3,000 cP. At this time, the solid content may refer to a solid content at the time when the adhesive composition of the present invention prepared in the form of a coating solution or the like is applied in the manufacturing process of an adhesive. As described above, when the adhesive composition of the present invention is used, the solid content in the coating solution may be increased without the deterioration in coating properties, so that not only productivity is excellent, but also precision control of, such as thickness, may be achieved.

The adhesive composition of the present invention described above may be usefully used as an adhesive for an optical member applied to a display and the like. Specifically, the adhesive composition may be used for attaching a polarizing plate and a liquid crystal panel, that is, as an adhesive for a polarizing plate.

Polarizing Plate

Next, a polarizing plate according to the present invention will be described.

The polarizing plate according to the present invention includes a polarizing film and an adhesive layer formed on one surface or both surfaces of the polarizing plate and containing a cured product of the adhesive composition according to the inventive concept described above.

The type of the polarizing film used in the present invention is not particularly limited. A typical type known in the art may be employed. For example, the polarizing film may include a polarizer and a protective film formed on one surface or both surfaces of the polarizer.

The type of the polarizer included in the polarizing plate of the present invention is not particularly limited. For example, a typical type known in the art such as polyvinyl alcohol-based polarizer will be employed without limitation.

The polarizer is a functional film or sheet capable of extracting only light which vibrates in one direction from light which is incident while vibrating in various directions. The polarizer described above may be, for example, in the form in which a dichroic pigment is adsorbed onto a polyvinyl alcohol-based resin film. The polyvinyl alcohol-based resin constituting the polarizer may be obtained, for example, by gelling a polyvinyl acetate-based resin. In this case, the polyvinyl acetate-based resin to be used may include a homopolymer of vinyl acetate as well as a copolymer of vinyl acetate and another monomer co-polymerizable with the same. Examples of the monomer co-polymerizable with vinyl acetate include a mixture of one or two or more of an unsaturated carboxylic acid, an olefin, a vinyl ether, an unsaturated sulfonic acid, and an acrylamide having an ammonium group, but are not limited thereto. The degree of gelation of the polyvinyl alcohol-based resin is typically 85 mol % to 100 mol %, preferably 98 mol % or greater. The polyvinyl alcohol-based resin may be further modified. For example, a polyvinyl formal or a polyvinyl acetal modified with an aldehyde group may also be used. Also, the degree of polymerization of the polyvinyl alcohol-based resin may typically be 1,000 to 10,000, preferably 1,500 to 5,000.

The polyvinyl alcohol-based resin described above may be defilmed to be used as a disc film of the polarizer. A method for defilming the polyvinyl alcohol-based resin is not particularly limited. A typical method known in the art may be used.

The thickness of the disc film defilmed with the polyvinyl alcohol-based resin is not particularly limited, and may be appropriately controlled, for example, in the range of 1 μm to 150 μm. In consideration of the ease of stretching and the like, the thickness of the disc film may be controlled to be 10 μm or greater.

The polarizer may be manufactured by stretching (ex. uniaxial stretching) the polyvinyl alcohol-based resin film described above, and then dyeing the stretched polyvinyl alcohol-based resin film with a dichroic dye and allowing the dichroic dye to be adsorbed, followed by treating the polyvinyl alcohol-based resin film adsorbed with the dichroic dye with a boric acid aqueous solution, and performing washing after the treatment with the boric acid aqueous solution. In the above, as the dichroic pigment, iodine or a dichroic organic dyes and the like may be used.

The polarizing film of the present invention may also include a protective film formed on one surface or both surfaces of the polarizer. The type of the protective film that may be included in the polarizing plate of the present invention is not particularly limited. For example, the protective film may be formed of a cellulose-based film such as triacetyl cellulose, a polyester-based film such as a polycarbonate film or a polyethylene terephthalate film, a polyether sulfone-based film, and/or a polyethylene film, a polypropylene film, or a polyolefin film having a cyclo-based or norbornene-based structure, or a multi-layered film in which a protective film composed of a polyolefin-based film such as an ethylene propylene copolymer is laminated. At this time, the thickness of the protective film is not particularly limited, either. The protective film may be formed to a typical thickness.

Meanwhile, in the present invention, a method for forming an adhesive layer on the polarizing film is not particularly limited. For example, a method of applying and curing an adhesive composition (coating liquid) on the film or a device by a typical means such as a bar coater, or a method of applying and curing an adhesive composition on the surface of a peelable base material, and then transferring an adhesive layer formed to the surface of a polarizing film or the device.

In the present invention, a process of forming an adhesive layer is preferably performed after sufficiently removing a volatile component, or a bubbles-inducing component such as reaction residues inside the adhesive composition (coating liquid). As a result, a problem in which the crosslinking density or molecular weight of the adhesive is too low, thereby lowering the elastic modulus, or bubbles present between a glass plate and the adhesive layer become bigger, thereby forming a scatterer therein may be prevented.

Meanwhile, a method for curing the adhesive composition of the present invention during manufacturing the polarizing plate is not particularly limited, either. A typical curing method known in the art may be performed. For example, the curing may be performed by maintaining a temperature at which a cross-liking reaction may be triggered between a cross-linkable functional group and a multi-functional cross-liking agent in the adhesive composition applied through heating and the like.

The polarizing plate of the present invention may further include one or more functional layers selected from the group consisting of a protective layer, a reflective layer, an anti-glare layer, a phase difference plate, a wide viewing angle compensation film, and a brightness enhancement film.

Display Device

Next, a display device according to the present invention will be described.

The display device of the present invention includes the above-described polarizing plate according to the present invention.

More specifically, the display device may be a liquid crystal display device including a liquid crystal panel having the polarizing plate according to the present invention bonded on one surface or both surfaces thereof. At this time, the type of the liquid crystal panel is not particularly limited. In the present invention, any known liquid crystal panel may be applied without being limited to the type thereof. For example, a liquid crystal panel of various passive matrix methods including a twisted neumatic (TN) type, a super twisted neutral (STN) type, a ferroelectric (F) type, and a polymer dispersed (PD) LCD type, a liquid crystal panel of various active matrix systems including a two terminal-type and a three terminal-type, an IPS mode panel, or a VA mode panel may be applied. In addition, the type and manufacturing method of other configurations included in the liquid crystal display device of the present invention are not particularly limited. Common configurations in the field may be employed and used without limitation.

MODE FOR CARRYING OUT THE INVENTION

Hereinafter, the present invention will be described in more detail with reference to specific examples.

Example 1

To a 3 L reactor in which nitrogen gas is refluxed, and a cooling device is installed to facilitate temperature control, a monomer mixture including 98 parts by weight of butyl acrylate (BA), 1.6 parts by weight of hydroxybutyl acrylate (HBA), and 0.4 parts by weight of a monomer represented by Formula 1-3 were added. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.02 parts by weight of azobis (2,4-dimethylvaleronitrile) (V-65, Manufacturer: Wako) was added thereto as a polymerization initiator, and then reacted to prepare an acrylic copolymer A.

100 parts by weight of the acrylic copolymer A prepared as described above was blended with 0.2 parts by weight of a multi-functional curing agent (coronate L, manufactured by Nippon Polyurethane Co., Ltd.), 0.01 parts by weight of a crosslinking catalyst (di-n-butyltin dilaurate, Sigma Aldrich), 0.2 parts by weight of a silane coupling agent (beta-cyanoacetyl group-containing silane coupling agent, LG Chem, M812), and then the mixture was diluted with ethyl acetate such that the solid content of the mixture becomes 25 wt %. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried becomes 23 μm, and then dried to form an adhesive coating layer. Thereafter, the adhesive coating layer was laminated on a polarizing plate to manufacture a polarizing plate including an adhesive layer.

Examples 2 to 5 and Comparative Examples 1 to 4

Acrylic copolymers B to K were prepared in the same manner as in Example 1 except that the type and content of the monomer used in preparing the acrylic copolymer were changed as described in Table 1 and Table 2, and n-dodecyl mercaptan (n-DDM, Sigma Aldrich) was added as a molecular weight control agent if necessary.

Thereafter, 100 parts by weight of each of the acrylic copolymers B to K prepared as described above was blended with a multi-functional curing agent (coronate L, manufactured by Nippon Polyurethane Co., Ltd.), a crosslinking catalyst (di-n-butyltin dilaurate, Sigma Aldrich), a silane coupling agent (beta-cyanoacetyl group-containing silane coupling agent, LG Chem, M812) in the amounts as described in Table 1 and Table 2, and then the mixture was diluted with ethyl acetate such that the solid content of the mixture becomes as described in Table 1 and Table 2. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried becomes 23 μm, and then dried to form an adhesive coating layer. Thereafter, the adhesive coating layer was laminated on a polarizing plate to manufacture a polarizing plate including an adhesive layer.

The physical properties of the acrylic copolymer, the adhesive composition, and the polarizing plate prepared in each of Examples 1 to 9 and Comparative Examples 1 to 4 were measured, and the measurement results are shown in Table 1 and Table 2 below.

Method for Measuring Physical Properties

1. Weight Average Molecular Weight:

The weight average molecular weight of the acrylic copolymer prepared in each of Examples and Comparative Examples was measured under the following conditions using GPC. A standard polystyrene of the Agilent system was used for manufacturing a calibration curve.

<Measurement Conditions>

Measurement device: Agilent GPC (Agulent 1200 series, USA)

Column: Two PL Mixed B connections

Column temperature: 40° C.

Eluent: tetrahydrofuran

Flow rate: 1.0 m/min

Concentration: ~1 mg/mL (100 μL injection).

2. Polymer Structure

The polymer structure of the acrylic copolymer prepared in each of Examples and Comparative Examples was evaluated in the following manner.

First, a monomer mixture was prepared by mixing the same alkyl (meth)acrylate-based monomer and (meth)acrylic monomer including a cross-linkable functional group as those used in an acrylic copolymer (hereinafter 'evaluation target copolymer'), the polymer structure of which is to be evaluated. At this time, the content of the (meth)acrylic monomer including a cross-linkable functional group in the monomer mixture were set to be the same as the content of the (meth)acrylic monomer including a cross-linkable functional group in the evaluation target copolymer. Thereafter, the monomer mixture was polymerized to prepare an acrylic copolymer (hereinafter 'standard copolymer') having an equivalent level of a weight average molecular weight (error range±5%) to the weight average molecular weight of the evaluation target copolymer.

Thereafter, to each of the standard copolymer and the evaluation target copolymer, an ethyl acetate solvent was added to adjust a viscosity level such that the solid concentration was to be 20-30 wt %, and the viscosity was measured. When the viscosity of the evaluation target copolymer which was measured as described above was significantly lower than the viscosity of the standard copolymer (for example, by 30% or greater), the evaluation target copolymer was evaluated as having a branched polymer structure, and in other cases, the evaluation target copolymer was evaluated as having a linear polymer structure.

3. Coating Solid Content (Unit: %)

Coating solid was measured by the following method.

First, the weight (A) of an aluminum dish was measured. Then, about 0.3-0.5 g (weight of a specimen before drying:

S) of the adhesive composition manufactured in each of Examples or Comparative Examples was collected and placed in the weighed aluminum dish. At this time, the weight B (A+S) of the specimen before drying including the weight of the aluminum dish was measured. Then, a small amount of ethyl acetate solution (0.5 wt % polymerization inhibitor concentration) in which a polymerization inhibitor (hydroquinone) was dissolved was added to the adhesive composition using a pipette, and then dried in an oven at 150° C. for about 30 minutes to remove a solvent. Thereafter, the dried specimen was cooled at room temperature for 15 minutes to 30 minutes, and then the weight including the weight C of the specimen after drying including the weight A of the aluminum dish was measured. The coating solid content was calculated according to Equation (1) below:

$$\text{Coating solid content (\%)} = \{(C-A)/(B/A)\} \times 100 \qquad \text{Equation (1);}$$

In Equation (1), A is the weight (unit: g) of the aluminum dish, and C is the weight (unit: g) of the sample after drying including the weight A of the aluminum dish. B is the weight (unit: g) of the sample before drying including the weight A of the aluminum dish.

4. Coating Viscosity (Unit: cP)

The coating viscosity of the adhesive compositions was evaluated according to the following procedure using a measurement device (Brookfield digital viscometer, RV DV2T).

220 mL of the adhesive composition was placed into a 250 mL PE bottle, and then the lid of the bottle was closed and tightly sealed with parafilm or the like to prevent a solvent from being volatilized. Thereafter, the adhesive composition was left under the constant temperature/humidity (23° C., 50% relative humidity) conditions to remove air bubbles. Then, the sealing and the lid were removed. Thereafter, a spindle was placed in the adhesive composition at an angle such that air bubbles were not generated, and the spindle was connected to a viscometer and then adjusted such that the liquid level of the adhesive composition fit the groove of the spindle. Thereafter, viscosity was measured under an rpm condition in which the torque was 20%(±1%).

5. Creep (Unit: μm)

The polarizing plate manufactured in each of Examples and Comparative Examples were cut to a size of 10 mm in width and 10 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement. After that, the specimen for measurement was stored for 5 days under the constant temperature/humidity conditions (23° C., 50% R. H.). Using a texture analyzer (TA, manufactured by Stable Micro Systems, UK), each creep was measured. Specifically, the creep was obtained by measuring a distance (unit: μm), the distance a polarizing plate is pushed from a glass substrate when a polarizing plate of the specimen for measurement was stretched for 1,000 seconds with a load of 1,000 g.

6. Room Temperature Adhesion Force (Unit: Gf/25 mm)

The polarizing plate manufactured in each of Examples and Comparative Examples was stored for 5 days under the constant temperature/humidity conditions (23° C., 50% R. H.), and then was cut to a size of 25 mm in width and 100 mm in length to prepare a specimen. Thereafter, the release PET film attached to the adhesive layer was peeled off, and the polarizing plate was attached to an alkali-free glass using a kg roller in accordance with JIS Z 0237 regulation to prepare a specimen for measurement.

The specimen for measurement was stored for 4 hours under the constant temperature/humidity conditions (23° C., 50% R. H.). Thereafter, using a texture analyzer (TA, manufactured by Stable Micro Systems, UK), a force required to completely separate a polarizing plate from a glass substrate by pulling the polarizing plate at a peeling rate of 300 mm/min and a peeling angle of 180 degrees was measured to measure adhesion force at room temperature (unit: gf/25 mm).

In addition, the specimen for measurement was stored for 4 hours under the constant temperature/humidity conditions (23° C., 50% R. H.), and then aged for 24 hours at 80° C. Using a texture analyzer (TA, manufactured by Stable Micro Systems, UK), a force required to completely separate a polarizing plate from a glass substrate by pulling the polarizing plate at a peeling rate of 300 mm/min and a peeling angle of 180 degrees was measured to measure adhesion force at room temperature after aging (unit: gf/25 mm).

7. Durability Evaluation

The polarizing plate manufactured in each of Examples and Comparative Examples was cut to a size of 180 mm×250 mm (length×width) to prepare a sample, and the sample was attached on a glass substrate to prepare a specimen for measurement.

The specimen for measurement were left to stand for 500 hours and 1000 hours, respectively, and the occurrence of bubbles or peeling was observed to evaluate heat resistance.

In addition, The specimens for measurement were left for 500 hours at a temperature of 85° C. and a relative humidity of 85% R.H., and then the occurrence of bubbles or peeling was observed to evaluate moisture and heat resistance.

<Evaluation Criteria>

OK: No bubbles and peeling

NG: Bubbles and/or peeling

TABLE 1

| Classification | | Examples | | | | | | | | |
|---|---|---|---|---|---|---|---|---|---|---|
| | | 1 | 2 | 3 | 4 | 5 | 6 | 7 | 8 | 9 |
| | Acrylic copolymer | A | B | C | D | E | F | F | G | H |
| Composition (parts by weight) | BA | 98 | 98 | 96 | 96 | 98 | 96 | 96 | 98 | 96 |
| | HBA | 1.6 | 1.7 | 3.7 | 3.7 | 1.7 | 3.7 | 3.7 | 1.7 | 3.7 |
| | Formula 1-3 | 0.4 | 0.3 | 0.3 | 0.3 | 0.3 | 0.3 | 0.3 | — | — |
| | Formula 1-4 | — | — | — | — | — | — | — | 0.3 | 0.3 |
| | Molecular weight control agent (ppm) | — | — | — | — | 500 | 500 | 500 | 500 | 500 |

TABLE 1-continued

| Classification | | Examples | | | | | | | | |
|---|---|---|---|---|---|---|---|---|---|---|
| | | 1 | 2 | 3 | 4 | 5 | 6 | 7 | 8 | 9 |
| Polymer structure | | | | | | Branch type | | | | |
| Weight average molecular weight | | 1.35 million | 1.30 million | 1.48 million | 1.48 million | 0.95 million | 0.90 million | 0.90 million | 1.10 million | 1.05 million |
| Curing agent (parts by weight) | | 0.2 | 0.2 | 0.2 | 0.5 | 0.2 | 0.2 | 0.5 | 0.2 | 0.2 |
| Crosslinking catalyst (parts by weight) | | 0.01 | 0.01 | 0.01 | 0.01 | 0.01 | 0.01 | 0.01 | 0.01 | 0.01 |
| Silane coupling agent (parts by weight) | | 0.2 | 0.2 | 0.2 | 0.2 | 0.2 | 0.2 | 0.2 | 0.2 | 0.2 |
| Coating solid (wt %) | | 25 | 25 | 20 | 20 | 30 | 30 | 30 | 25 | 25 |
| Coating viscosity (cP) | | 2350 | 2200 | 2500 | 2500 | 1500 | 1800 | 1800 | 1151 | 1200 |
| Push distance | | 285 | 320 | 280 | 140 | 310 | 295 | 130 | 305 | 285 |
| Room temperature adhesion force | 5 days later | 223 | 240 | 350 | 185 | 230 | 365 | 195 | 295 | 311 |
| | Post-aging | 747 | 826 | 1105 | 648 | 808 | 1201 | 675 | 944 | 1025 |
| | change rate (%) | 235 | 244 | 216 | 250 | 252 | 229 | 246 | 220 | 230 |
| Durability | Heat resistance (90° C., 500 hr) | OK | OK | OK | OK | OK | OK | OK | OK | OK |
| | Heat resistance (90° C., 1000 hr) | OK | OK | OK | OK | OK | OK | OK | OK | OK |
| | Moisture and heat resistance | OK | OK | OK | OK | OK | OK | OK | OK | OK |

TABLE 2

| Classification | | Comparative Example | | | |
|---|---|---|---|---|---|
| | | 1 | 2 | 3 | 4 |
| Acrylic copolymer | | I | J | J | K |
| Composition (parts by weight) | BA | 98 | 95 | 95 | 98 |
| | HBA | 2 | 5 | 5 | 2 |
| | Formula 1-3 | — | — | — | — |
| | Formula 1-4 | — | — | — | — |
| | Molecular weight control agent (ppm) | — | — | — | 100 |
| Polymer structure | | | Branch type | | |
| Weight average molecular weight | | 140 | 160 | 160 | 95 |
| Curing agent (parts by weight) | | 0.2 | 0.2 | 0.5 | 0.2 |
| Crosslinking catalyst (parts by weight) | | 0.01 | 0.01 | 0.01 | 0.01 |
| Silane coupling agent (parts by weight) | | 0.2 | 0.2 | 0.2 | 0.2 |
| Coating solid (wt %) | | 13 | 13 | 13 | 20 |
| Coating viscosity (cP) | | 1800 | 2150 | 2150 | 1900 |
| Push distance | | 315 | 289 | 128 | 305 |
| Room temperature adhesion force | 5 days later | 245 | 530 | 195 | 250 |
| | Post-aging | 980 | 2150 | 890 | 1025 |
| | Change rate (%) | 300 | 306 | 356 | 310 |
| Durability | Heat resistance (90° C., 500 hr) | NG | NG | NG | NG |
| | Heat resistance (90° C., 1000 hr) | NG | NG | NG | NG |
| | Moisture and heat resistance | NG | NG | NG | NG |

As shown in Table 1 and Table 2, the adhesive composition of each of Examples 1 to 9 in which an adhesive resin including an acrylic copolymer with a monomer represented by [Formula 1] is used had excellent durability in high temperature and high temperature/high humidity environments compared to the adhesive composition of each of Comparative Examples 1 to 4, and had less change over time in the adhesion layer physical properties.

The invention claimed is:

1. An adhesive resin comprising:
an acrylic copolymer formed by polymerizing a monomer mixture including a monomer represented by [Formula 1],
a (meth)acrylic monomer having a cross-linkable functional group, and
an alkyl (meth)acrylate-based monomer:

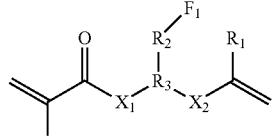

[Formula 1]

wherein,
$F_1$ is —OH, —COOH, or —SH,
$X_1$ is a single bond, —O—, —NH—, an alkylene group having 1 to 10 carbon atoms, or a combination thereof,
$X_2$ is a single bond, an alkylene group having 1 to 10 carbon atoms, —COO—, or a combination thereof,
$R_1$ is hydrogen or an alkyl group having 1 to 4 carbon atoms,
$R_2$ is a single bond or an alkylene group having 1 to 10 carbon atoms,
$R_3$ is an arene having 6 to 20 carbon atoms or an alkane having 1 to 10 carbon atoms,
wherein the monomer mixture comprises the monomer represented by [Formula 1] in an amount of 0.01 part by weight to 0.4 part by weight based on 100 parts by weight of the monomer mixture.

2. The adhesive resin of claim 1, wherein the acrylic copolymer has a weight average molecular weight of 500,000 g/mol to 1,500,000 g/mol.

3. The adhesive resin of claim 1, wherein the acrylic copolymer has a branched polymer structure.

4. The adhesive resin of claim 1, wherein the monomer represented by Formula 1 is one or more selected from the group consisting of compounds represented by Formulas 1-1 to 1-4 below:

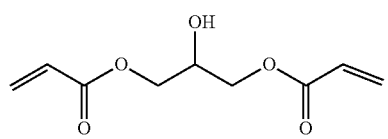

[Formula 1-1]

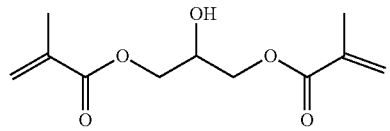

[Formula 1-2]

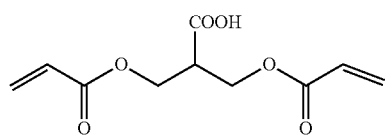

[Formula 1-3]

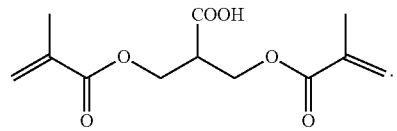

[Formula 1-4]

5. The adhesive resin of claim 1, wherein the monomer mixture comprises:
   84 parts by weight to 99.89 parts by weight of the alkyl (meth)acrylate-based monomer, based on 100 parts by weight of the monomer mixture; and
   0.1 to 15 parts by weight of the (meth)acrylic monomer having a cross-linkable functional group, based on 100 parts by weight of the monomer mixture.

6. An adhesive composition for an optical member, comprising the adhesive resin of claim 1 and a multi-functional curing agent.

7. The adhesive composition of claim 6, wherein the multi-functional curing agent comprises an isocyanate-based compound, an epoxy-based compound, an aziridine-based compound, or a metal chelate-based compound.

8. The adhesive composition of claim 6, wherein the multi-functional curing agent is included in an amount of 0.01 to 1 part by weight based on 100 parts by weight of the adhesive resin.

9. A polarizing plate comprising an adhesive layer including a cured product of the adhesive composition of claim 7.

10. A display device comprising the polarizing plate of claim 9.

* * * * *